March 7, 1933.  F. C. FRANK  1,900,101
WHEEL
Filed Feb. 11, 1929
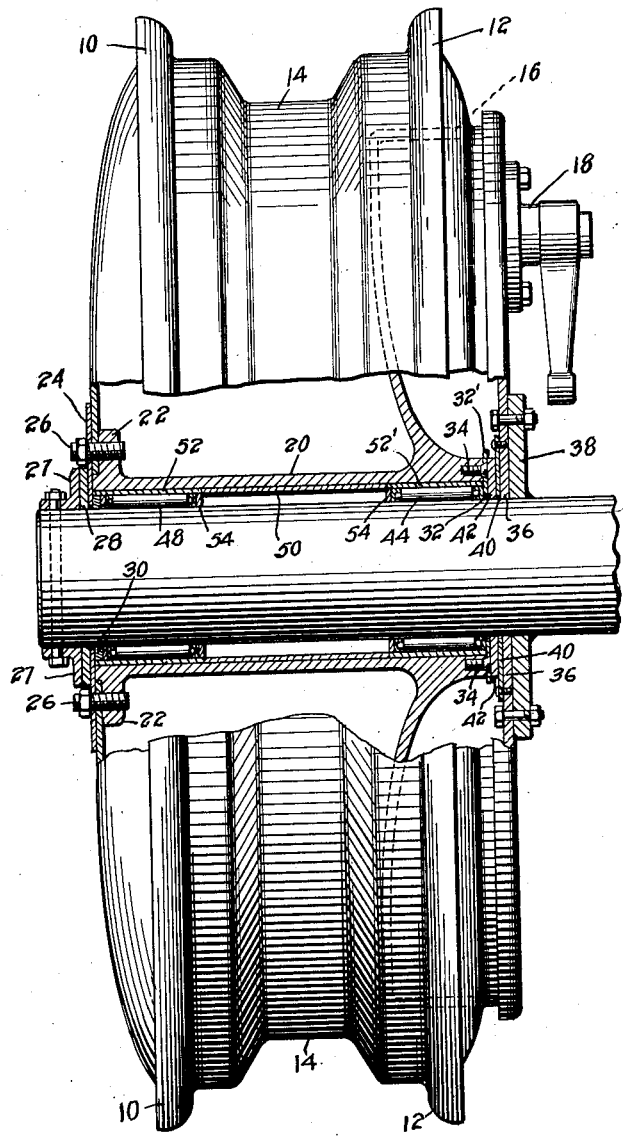
INVENTOR
F. C. FRANK
BY
Semmes & Semmes
ATTORNEYS Patented Mar. 7, 1933

1,900,101

UNITED STATES PATENT OFFICE

FREDERICK C. FRANK, OF SOUTH BEND, INDIANA, ASSIGNOR TO BENDIX BRAKE COMPANY, OF SOUTH BEND, INDIANA, A CORPORATION OF ILLINOIS

WHEEL

Application filed February 11, 1929. Serial No. 339,105.

This invention relates to wheels and is illustrated as embodied in a double disk wheel suited for use on heavy aeroplanes.

An object of the invention is to provide a compact and rigid wheel of this type embodying a novel hub and bearing construction wherein there is provided, on each end of the hub, a thrust plate having a three-fold function. The outer plate serves as a reinforcing member, a thrust member and bearing retainer and the inner plate functions as an oil sling, a thrust member and a bearing retainer.

The above feature, together with a novel arrangement of roller bearings and other objects and desirable details of construction, will be apparent from the following description of the illustrated embodiment shown in the accompanying drawing disclosing partly in plan and partly in vertical section my novel double disk wheel.

As illustrated in the drawing the wheel may comprise disk body members 10 and 12 supporting a "drop center" rim 14, the outer disk 10 being outwardly convex or crowned and the inner disk shaped to provide a brake drum 16 for braking mechanism 18. The body member 12 is preferably cast integral with a laterally extending hub 20, the latter being provided with a radially extending rabbeted flange 22 at its outer end. Disk member 10 is preferably arranged against the hub flange 22 and is seated on the shoulder formed by the rabbeted portion to present a smooth outer surface with the end of the hub.

According to an important feature of my invention, there is provided a circular steel washer 24 overlying the disk and hub and overlapping the hub to extend beyond its periphery. Stud bolts 26 are provided to secure the washer and disk to the hub flange. The washer 24 has a three fold function in that it serves first as a reinforcing member for the laterally flexed disk, secondly as a thrust member for the wheel body which contacts a thrust bearing comprising an angle sectioned stop 27 and juxtaposed thrust ring 28, and thirdly as a retainer for a felt grease retaining washer 30.

At the inner end of the hub 20 there is provided a steel washer 32, secured to the hub as by countersunk cap screws 34, and which also serves a three-fold purpose; first, as an "oil sling", being extended slightly beyond the hub to eliminate the possibility of oil entering the drum, secondly as a thrust member to contact a thrust bearing comprising a brake support plate 36 attached to axle flange 38, a hardened steel thrust washer 40, and a loosely sleeved thrust ring 42 and, thirdly, functioning as a retainer for the inner roller bearing 44 of the wheel.

A further feature of the invention resides in my novel roller bearing structure comprising keepers or races 46, two for each set of rollers 48 and 44, which rollers are spaced by a hardened steel tubular spacer 50 sleeved tightly within the hub. Tubular sleeves 52 and 52' are also provided to take the wear of the roller bearings; and washers 54, together with the end washer 32, confine the bearings laterally.

It will be noted that these roller bearings are so spaced that each lies directly in the plane of an outer edge of the rim. This is quite noteworthy and a valuable feature in utilizing this wheel for airplane purposes, since it possesses all of the advantages of a wheel having a single continuous roller bearing, at the same time being lighter in weight.

A rigid and compact hub and bearing structure is thus provided well suited for the rigorous service demanded of a wheel of this type.

While but one embodiment of my invention has been disclosed and described in detail, it is not my intention to limit myself to that particular embodiment or otherwise than by the terms of the appended claims.

I claim:

1. A wheel comprising a hub, a member sleeved in the hub, a washer secured to one end of the hub extending beyond the outer and inner peripheries of the hub and engaging one end of the member sleeved in the hub, a radial shouldered flange on the other end of the hub, a disk secured to the flange and resting on the shoulder to present an unbroken outer surface with the hub, and a washer secured to the flange overlapping the junction of the disk with the shoulder and extending beyond the flange to reinforce the disk and beyond the inner periphery of the hub to engage the other end of the member sleeved in the hub to effectively retain the member in the hub.

2. A wheel comprising a hub, a cylindrical bearing member sleeved in the hub, a washer secured to one end of the hub extending beyond the inner and outer peripheries of the hub and engaging the member sleeved in the hub, a shouldered flange on the other end of the hub, a disk body member seated on the shoulder and bearing against the flange, a hardened washer flapped against the disk and extending beyond the flange and the inner periphery of the hub and engaging the member sleeved in the hub and securing members passing through the flange, the disk and the hardened washer.

In testimony whereof, I have hereunto signed my name.

FREDERICK C. FRANK.